(12) United States Patent
Luo et al.

(10) Patent No.: US 8,471,167 B2
(45) Date of Patent: Jun. 25, 2013

(54) ROUGH MACHINING ELECTROEROSION METHOD FOR MACHINING A CHANNEL IN A WORKPIECE

(75) Inventors: Yuanfeng Luo, Shanghai (CN); Garth Nelson, Ballston Lake, NY (US); Ugo Cantelli, Florence (IT); Renwei Yuan, Shanghai (CN); Yimin Zhan, Shanghai (CN)

(73) Assignee: General Electric Company, Niskayuna, NY (US)

( * ) Notice: Subject to any disclaimer, the term of this patent is extended or adjusted under 35 U.S.C. 154(b) by 1447 days.

(21) Appl. No.: 12/098,478

(22) Filed: Apr. 7, 2008

(65) Prior Publication Data
US 2009/0001053 A1 Jan. 1, 2009

(30) Foreign Application Priority Data
Jun. 29, 2007 (CN) .............................. 200710126362

(51) Int. Cl.
*B23H 9/00* (2006.01)
(52) U.S. Cl.
USPC ........................................ 219/69.17; 205/686
(58) Field of Classification Search
USPC ............ 219/69.15, 69.17, 69.2, 69.11, 69.14; 205/653, 654, 665, 668, 686
See application file for complete search history.

(56) References Cited

U.S. PATENT DOCUMENTS

| | | | | |
|---|---|---|---|---|
| 2,715,172 A | * | 8/1955 | Larkins, Jr. | 219/69.15 |
| 2,902,584 A | * | 9/1959 | Werner | 219/69.15 |
| 3,293,166 A | * | 12/1966 | Cowing | 204/224 M |
| 3,330,754 A | | 7/1967 | Trager et al. | |
| 3,340,166 A | | 9/1967 | Trager et al. | |
| 3,468,784 A | * | 9/1969 | Joyce et al. | 205/653 |
| 3,485,744 A | * | 12/1969 | Schaffner | 204/224 M |
| 3,622,734 A | * | 11/1971 | Mainwaring | 219/69.15 |
| 3,793,170 A | | 2/1974 | Andrews | |
| 4,251,706 A | | 2/1981 | Frei et al. | |
| 4,698,543 A | * | 10/1987 | Patton | 313/357 |
| 5,059,289 A | * | 10/1991 | Gaskell | 204/224 M |
| 5,306,401 A | * | 4/1994 | Fierkens et al. | 205/654 |
| 5,614,108 A | * | 3/1997 | Habel et al. | 219/69.15 |
| 2004/0074876 A1 | | 4/2004 | Varin | |
| 2004/0093727 A1 | | 5/2004 | Mola | |

FOREIGN PATENT DOCUMENTS

| | | | |
|---|---|---|---|
| EP | 416541 A1 * | 3/1991 | |
| JP | 62-287939 A * | 12/1987 | |
| JP | 7-24640 A * | 1/1995 | |
| JP | 8-99223 A * | 4/1996 | |

* cited by examiner

*Primary Examiner* — Geoffrey S Evans
(74) *Attorney, Agent, or Firm* — Andrew J. Caruso

(57) ABSTRACT

A rough machining method for machining a channel in a workpiece includes the steps of: provide a power supply to energize one of a workpiece and an electrode as an anode and the other as a cathode; advance the electrode into the workpiece from a first start point to travel a first toolpath, so as to generate a first annular groove with a first core connecting with the workpiece; advance the electrode into the workpiece from a second start point to travel a second toolpath, so as to generate a second annular groove with a second core connecting with the workpiece, wherein the second annular groove intersects with the first annular groove and the first and the second cores are at least partially broken and disconnected with the workpiece upon intersecting of the first and the second annular grooves; and circulating a cutting fluid cross a working gap between a working face of the electrode and the workpiece.

14 Claims, 9 Drawing Sheets

ROUGH MACHINING ELECTROEROSION METHOD FOR MACHINING A CHANNEL IN A WORKPIECE

CROSS REFERENCE TO RELATED APPLICATION

This application claims priority to CHINA Application Serial No. 200710126362.5 filed Jun. 29, 2007, incorporated in its entirety herein by reference.

BACKGROUND

The present invention relates to machining methods and tools, and more particularly to a rough machining method and an electroerosion tool for performing the method.

Trepanning methods typically produce holes in a workpiece by cutting an annular groove about a removable core. Compared to conventional drilling methods, trepanning methods are particularly advantageous for cutting large diameter holes, as they are much faster with less energy consumption.

Conventional trepanning methods, however, are generally used for machining straight through holes without any solution for machining curved or angular channels. Accordingly, there is a need in the art for a bulk removal method or tool that is useful for machining curved or angular channels.

BRIEF DESCRIPTION

One aspect of the invention resides in a rough machining method for machining a channel in a workpiece. The rough machining method includes: energize one of a workpiece and an electrode as an anode and the other as a cathode; advance the electrode into the workpiece from a first start point to travel a first toolpath, so as to generate a first annular groove with a first core connecting with the workpiece; and advance the electrode into the workpiece from a second start point to travel a second toolpath, so as to generate a second annular groove with a second core connecting with the workpiece. The second annular groove intersects with the first annular groove, and the first and the second cores are at least partially broken and disconnected with the workpiece upon intersecting of the first and the second annular grooves. Circulate a cutting fluid cross a working gap between a working face of the electrode and the workpiece.

Another aspect of the invention resides in an electroerosion tool for machining a workpiece. The electroerosion tool includes an electrode. The electrode has a peripheral wall, and a hollow portion surrounded by the peripheral wall. The peripheral wall includes a working face for electroerosion of the workpiece. At least one slot is defined in the peripheral wall and is exposed to the working face. A cutting fluid supply provides a cutting fluid to the electrode during machining operation. The cutting fluid flows across a working gap between the working face of the electrode and the workpiece and through the at least one slot in the peripheral wall.

DRAWINGS

These and other features, aspects, and advantages of the present invention will become better understood when the following detailed description is read with reference to the accompanying drawings in which like characters represent like parts throughout the drawings, wherein:

FIG. 1 schematically and exemplarily illustrates a step of a rough machining method for machining a workpiece with an electroerosion tool, wherein the electroerosion tool is schematically shown as an electrode which is advanced into the workpiece from a front surface of the workpiece.

FIG. 2 is similar to FIG. 1 and shows another step of the rough machining method, wherein the electrode is advanced into the workpiece from an outer circumferential face of the workpiece.

FIG. 3 schematically illustrates an exemplary embodiment of the electroerosion tool used with the rough machining operation.

Figure 11:
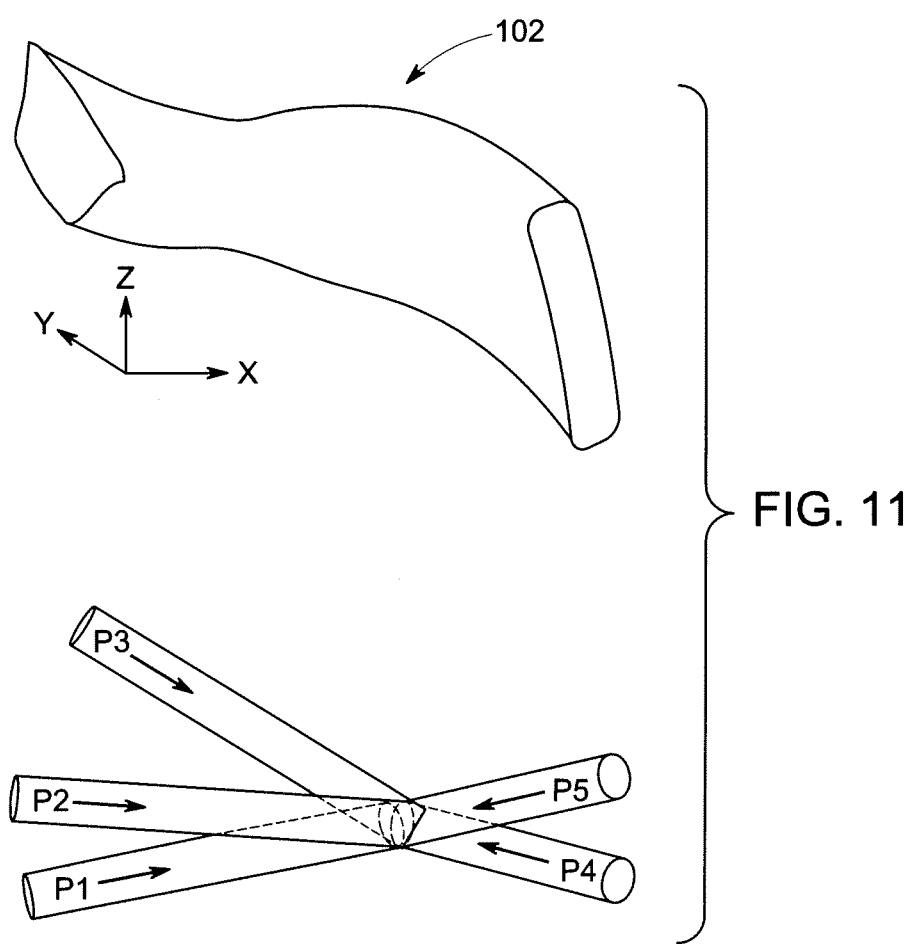

FIG. 11 schematically illustrates materials to be removed from the workpiece for defining a channel in the workpiece, and an exemplary strategy for machining such a channel according to the first embodiment of the rough machining method of the present invention.

Figure 12:
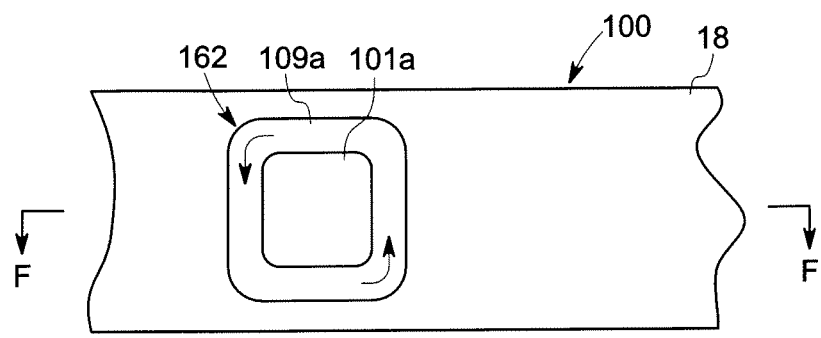

FIG. 12 schematically and exemplarily illustrates a plan view of the front face of the workpiece with a first conic annular groove therein according to a second embodiment of the rough machining method.

Figure 13:
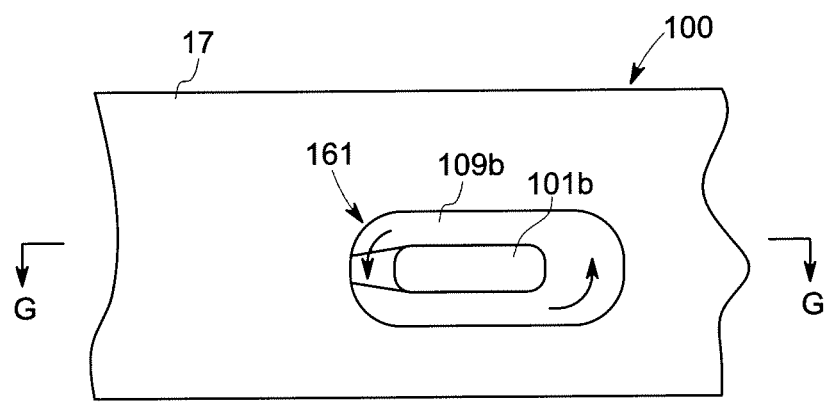

FIG. 13 schematically and exemplarily illustrates a plan view of the outer circumferential face of the workpiece with a second conic annular groove therein according to the second embodiment of the rough machining method.

Figure 14:
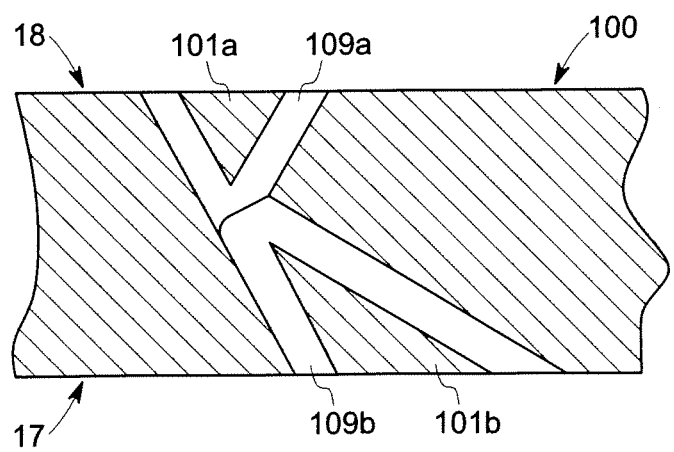

FIG. 14 is a cross-sectional view of the workpiece along a curved center plane of the channel to be machined, through line F-F of the front surface and line G-G of the outer circumferential face, showing the first and second conic annular grooves intersecting with each other.

DETAILED DESCRIPTION

Figure 1:
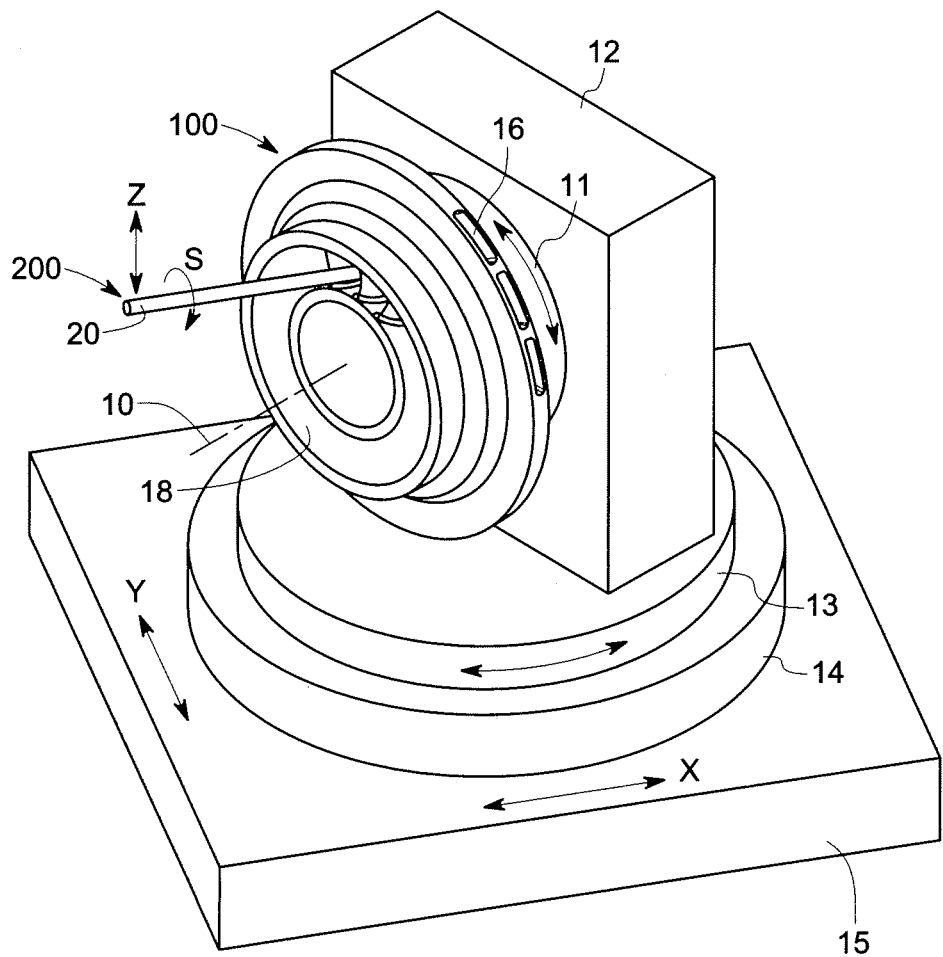
Figure 2:
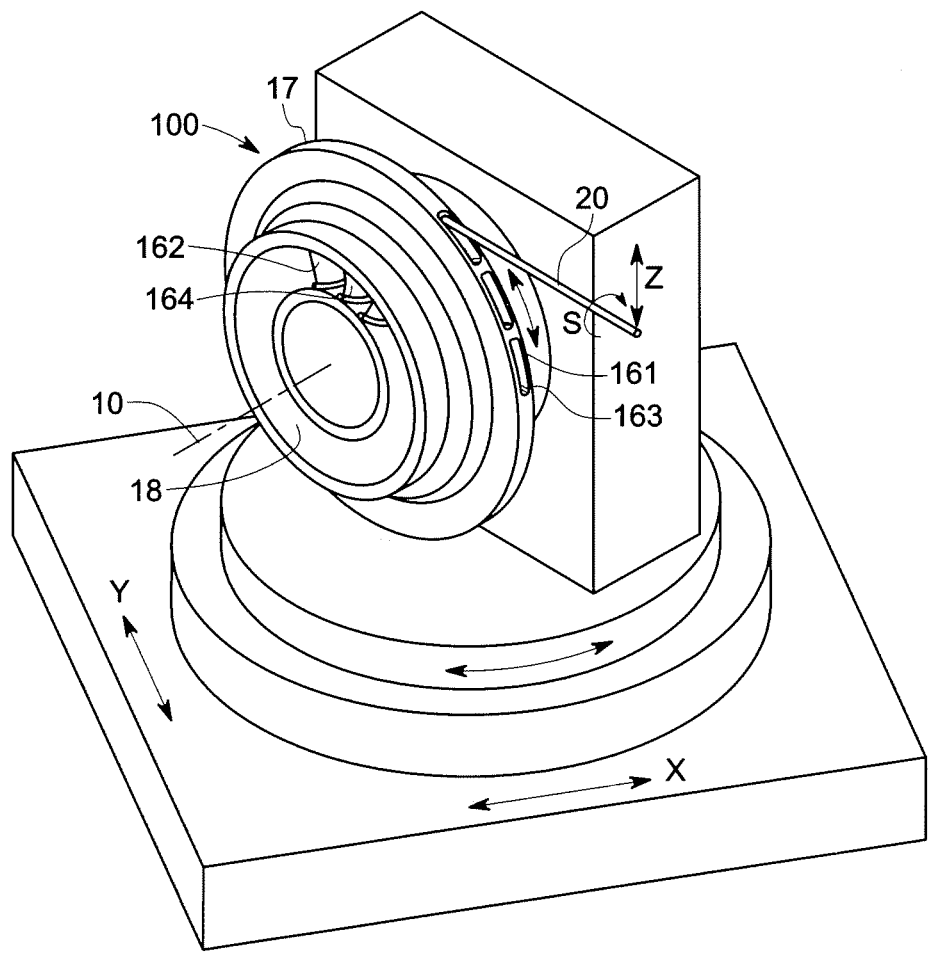

Referring to FIGS. 1 and 2, a workpiece 100 is machined into an annular impeller by an electroerosion tool 200 using a rough machining method. In this embodiment, the workpiece 100 is axisymmetrical about a longitudinal or axial centerline 10, with the resulting impeller also being axisymmetrical thereabout. The electroerosion tool 200 is schematically shown as a tubular cutting means, which is an electrode 20 in the exemplary embodiment. The electroerosion tool 200 will be described in more detail below.

The workpiece 100 is supported by a suitable support member with desired axis of movement. In the exemplary embodiment, the workpiece 100 is coaxially supported by a spindle 11. The spindle 11 is rotatably attached to a vertical support member 12 and the vertical support member 12 is supported by stacked upper and lower support members 13, 14. The upper and lower support members 13, 14 are coaxial to a vertical axis (not shown) and supported on a bottom support member 15. During machining operation, the spindle 11, together with the workpiece 100, is rotatable about the centerline 10 of the workpiece 100; the upper support member 13 is rotatable around the vertical axis of the upper and lower support members 13, 14; the lower support member 14 is movable in both a longitudinal axis X and a lateral direction Y, the electrode 20 is movable in an upper-to-lower direction Z, and thus a five-axis machining process can be performed.

In the exemplary embodiment, the workpiece 100 is an annular blank forging of suitable high-strength material. The finished impeller includes a plurality of channels 16 that are formed by removing shavings from the workpiece 100. The channels 16 are typically uniformly distributed along a radial direction of the impeller. FIGS. 1 and 2 show that three channels 16 have been machined and it is understandable that the other channels 16 are to be machined by the rough machining method described hereinafter. As shown in FIG. 2, each channel 16 includes a first opening 161 in an outer circumferential face 17 of the workpiece 100, a second opening 162 in a front surface 18 of the workpiece 100, and a passage 163 between the first and second openings 161, 162. A rib 164 is formed between every two adjacent channels 16.

Figure 3:
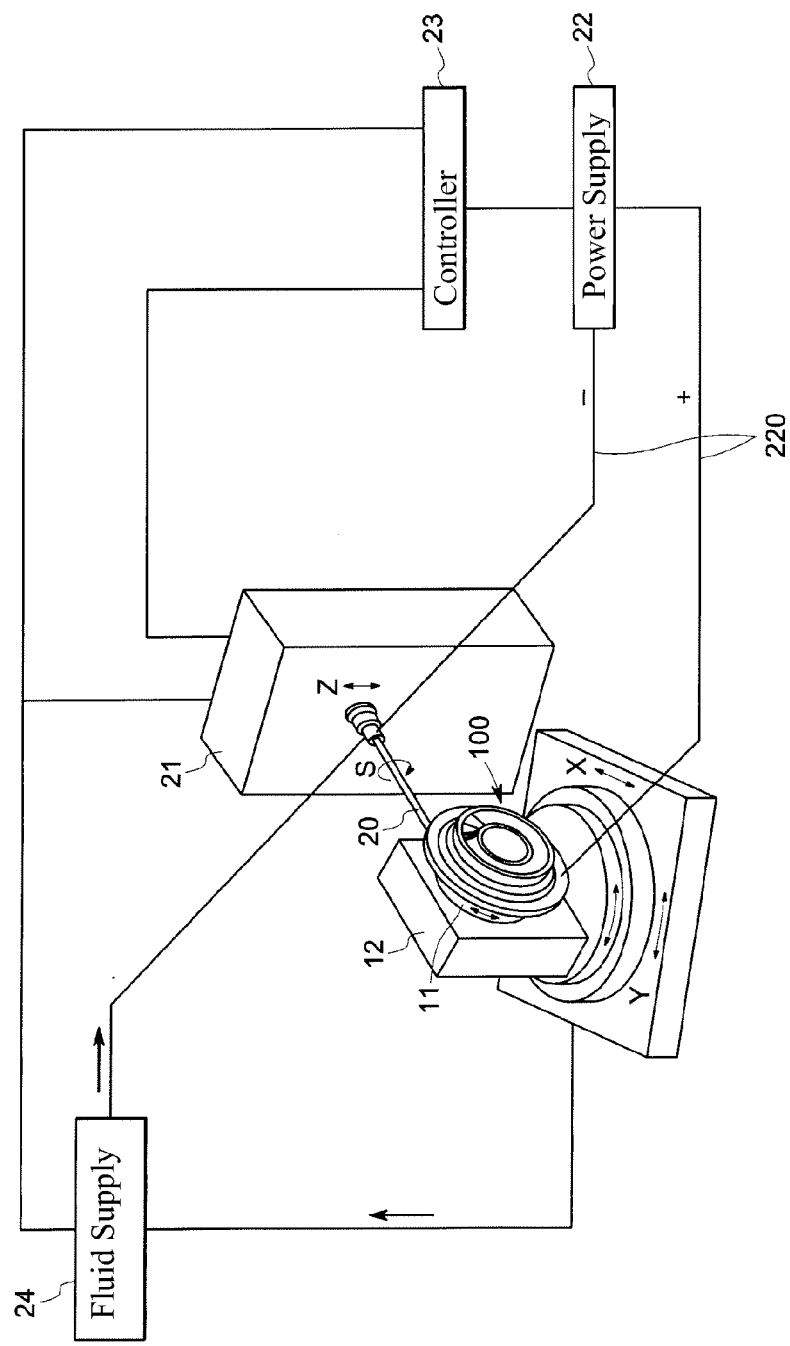

An electroerosion tool 200 is schematically illustrated in FIG. 3. The electroerosion tool 200 is an Electrochemical Discharge Machining (ECDM) machine or apparatus in the present embodiment. The electroerosion tool 200 could be any other electroerosion tools such as tools of Electrochemical Machining (ECM), or Electrical Discharge Machining (EDM), or the like.

The electroerosion tool 200 includes the electrode 20 and a multiaxis numerically controlled (NC) machine 21. The NC machine 21 supports the electrode 20 for rotating about an axis S thereof. The electroerosion tool 200 also includes a direct current (DC) power supply 22 for carrying electrical power through the electrode 20 and the workpiece 100 during rough machining operation. The DC power supply 22 can send pulsed power or constant power to the electrode 20 and the workpiece 100. The power supply 22 includes suitable electrical leads 220, correspondingly joined to the electrode 20 as a cathode (−) and the workpiece 100 as an anode (+) in the present embodiment. In alternate embodiments, the polarity is reversed with an anode electrode 20 and a cathode workpiece 100. Since the electrode 20 spins during operation, the electrical lead 220 therefore is suitably joined thereto using a conventional electrical slip ring or other connection as desired. The lead 220 for the workpiece 100 is typically directly attached thereto or to the supporting spindle 11 as desired. Insulators (not shown) may be arranged between the electrode 20 and the NC machine 21, as well as between the spindle 11 and the vertical support member 12, and thus the power supply is not transmitted to the NC machine 21 or the support members during the machining operation.

A digitally programmable electrical controller 23 is operatively joined respectively to the NC machine 21 and the DC power supply 22 for controlling operations of the NC machine 21 and the DC power supply 22, as well as to coordinate relative movement between the electrode 20 and the workpiece 100 during the rough machining operation. The controller 23 may have any conventional form and includes a central processing unit (CPU) and all attendant memory and data handling systems which may be programmed using suitable software for controlling all operations of the electroerosion tool 20 and the workpiece 100. A monitor and keyboard (not shown) may be provided with the controller 23 for use both by the operator in controlling the rough machining process, as well as by the programmer for initially setting up some parameters.

A cutting fluid supply 24 is provided for circulating a cutting fluid through the electrode 20 during rough machining operation. The cutting fluid supply 24 includes various conduits (not shown) for supplying clean and cool cutting fluid to the electrode 20 while returning debris-laden cutting fluid from the machining site. The cutting fluid may be plain water, or oil, or other liquid having weak or strong electrical conductivity as desired. Operation of the cutting fluid supply 24 is also controlled by the controller 23.

The electrode 20 for performing a first embodiment of the rough machining method, of different embodiments, is illustrated in more detail through FIGS. 4 to 10 and indicated by the reference numbers 20a-20d. The electrode 20a-20d includes a peripheral wall 201, and an interior hollow portion 202 surrounded by the peripheral wall 201. The peripheral wall 201 has a front tip portion 207 and the front tip portion 207 has a circular working face 206 for performing the rough machining operation. Dimensions of the hollow portion 202 are typically larger than the thickness of the peripheral wall 201 for performing trepanning operations of the first embodiment of the rough machining method. In the exemplary embodiments, the electrode 20a-20d has a tubular cross-sectional view as shown in FIGS. 4, 6, 8 and 10. However, cross-sectional views of different shapes can also be applied to the electrode, for example, polygon, ellipse or other shapes.

Figure 5:
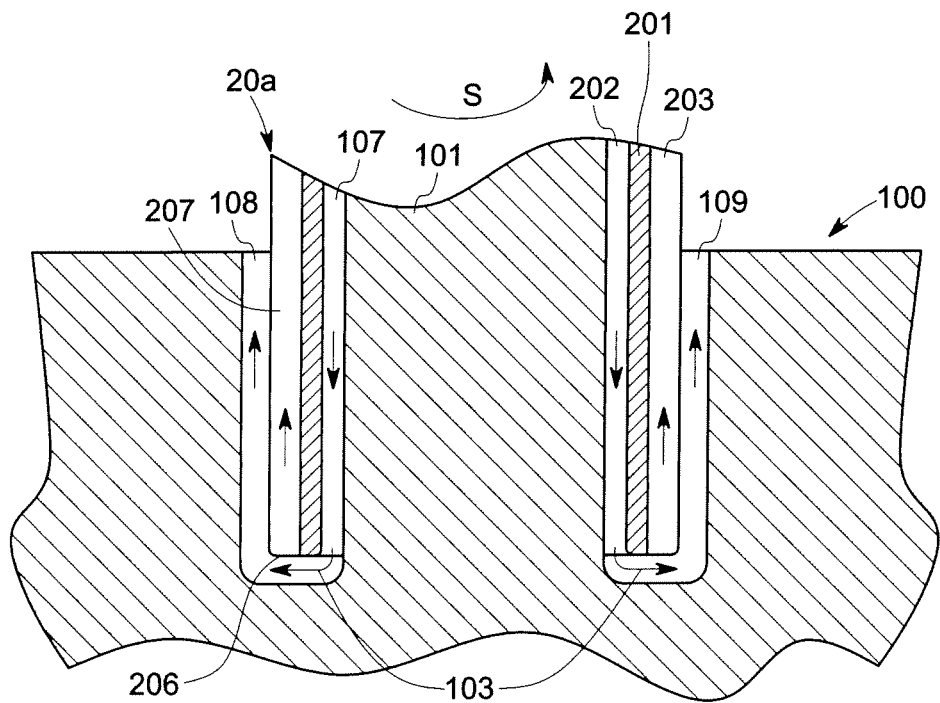
FIG. 5 is an enlarged cross-sectional view of a tip portion of the electrode, taken along line A-A of FIG. 4, as the electrode is advanced into the workpiece.
Figure 7:
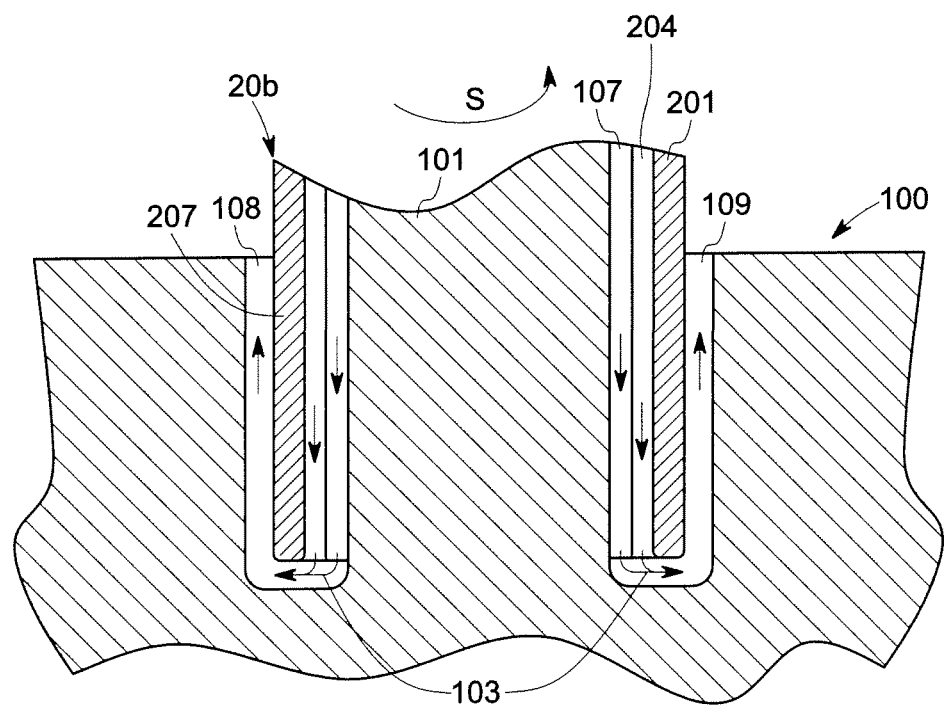
FIG. 7 is an enlarged cross-sectional view of a tip portion of the electrode, taken along line B-B of FIG. 6, as the electrode is advanced into the workpiece.
Figure 9:
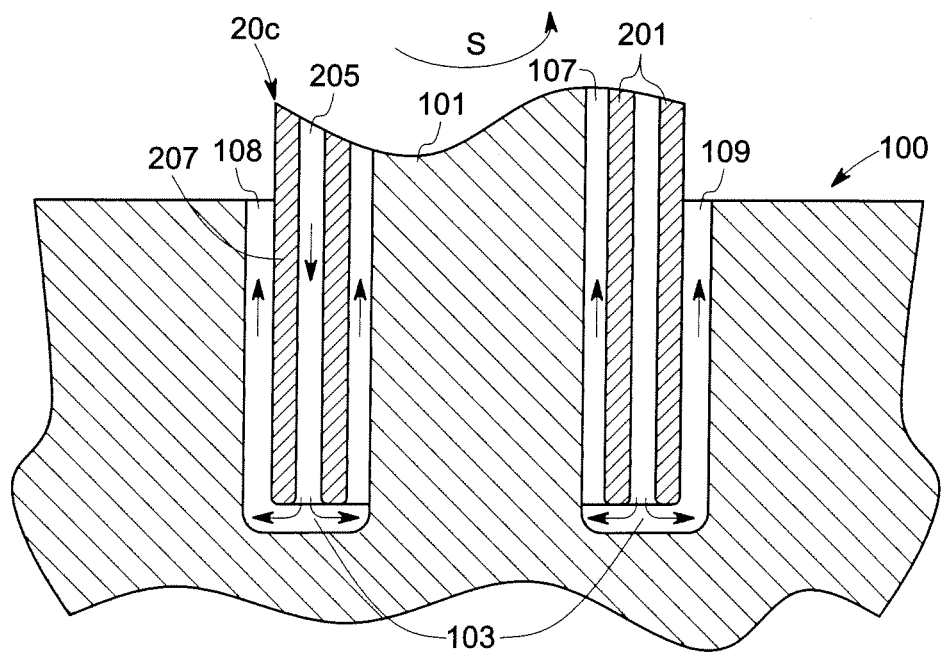
FIG. 9 is an enlarged cross-sectional view of a tip portion of the electrode, taken along line C-C of FIG. 8, as the electrode is advanced into the workpiece.

For performing a designated trepanning toolpath as shown in FIGS. 5, 7 and 9, the electrode 20a-20d spins S thereof and is advanced into the workpiece 100 along a path controlled by the controller 23 (FIG. 3). A working gap 103 is maintained between the circular working face 206 of the electrode 20a-20d and the receding corresponding surface of the workpiece 100. The corresponding surface of the workpiece 100 is continuously eroded away with or without electrical arcs. Thus an annular groove 109 and a core 101 are gradually formed. An inner gap 107 is defined between the core 101 and an inner surface of the peripheral wall 201. An outer gap 108 is defined between an outer surface of the peripheral wall 201 and a sidewall of the annular groove 109. During the rough machining operation, the cutting fluid supply 24 continuously pumps cool and clean cutting fluid to flow across the working gap 103 to take away the shavings as well as heat generated during the machining operation. As the tip portion 207 of the electrode 20a-20d wears during operation, real-time calibration of the electrode 20a-20d is applied and the electrode 20a-20d is continually indexed lower accordingly.

Figure 4:
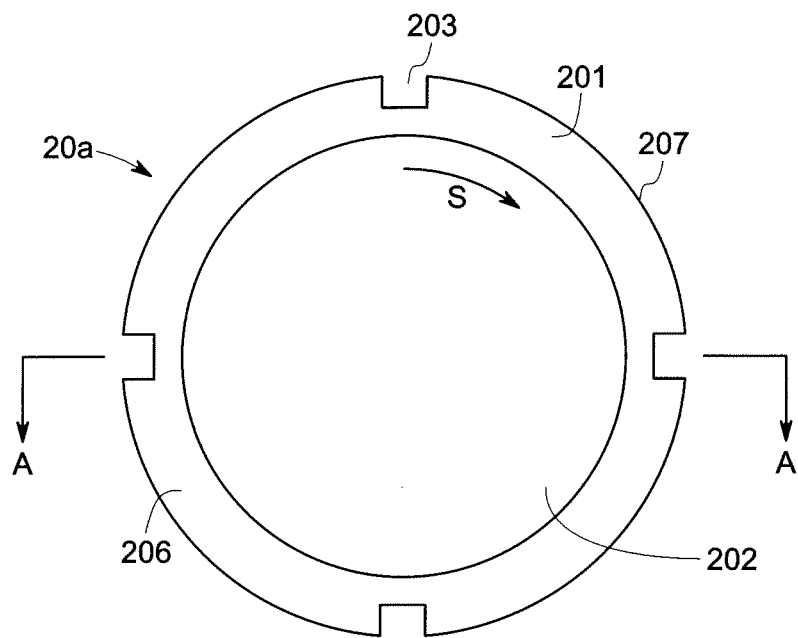
FIG. 4 is a plan view of a working face of a first embodiment of the electrode for implementing a first embodiment of the rough machining method.

A first embodiment of the electrode 20a is illustrated in FIGS. 4 and 5, wherein FIG. 4 is a plan view of the working face 206 of the first embodiment of the electrode 20a, and FIG. 5 is an enlarged cross-sectional view of the tip portion 207 of the electrode 20a, taken along line A-A of FIG. 4, during the rough machining operation. The electrode 20a includes a plurality of slots 203 in the outer surface of the peripheral wall 201. As shown in FIG. 5, during rough machining operation, cool and clean cutting fluid is forced under high pressure from the cutting fluid supply 24 (FIG. 3) into the electrode 20a through inner gap 107 between the core 101 and the electrode 20a, and flows across the working gap 103 between the advancing working face 206 of the electrode 20a and the receding corresponding surface of the workpiece 100, and then is forced to flow out through the outer gap 108 between the electrode 20a and the workpiece 100, as well as the slots 203 in the outer surface of the electrode 20a, thereby taking away the shavings and the heat generated during the rough machining operation.

Figure 6:
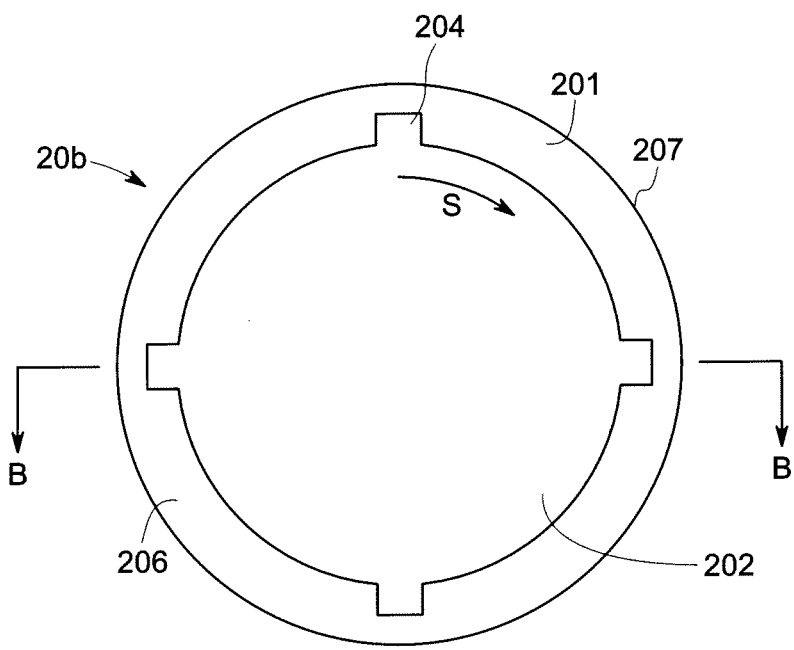
FIG. 6 is a plan view of a working face of a second embodiment of the electrode for implementing the first embodiment of the rough machining method.

A second embodiment of the electrode 20b for performing the first embodiment of the rough machining method is illustrated in FIGS. 6 and 7, wherein FIG. 6 is a plan view of the working face 206 of the second embodiment of the electrode 20b, and FIG. 7 is an enlarged cross-sectional view of the tip portion 207 of the electrode 20b, taken along line B-B of FIG. 6, during rough machining operation. The electrode 20b includes a plurality of slots 204 in the inner surface of the peripheral wall 201. As shown in FIG. 7, during rough machining operation, cool and clean cutting fluid is forced under high pressure from the cutting fluid supply 24 (FIG. 3) into the electrode 20 through the hollow portion 202 as well as through the slots 204 in the inner surface of the peripheral wall 201, and flows across the working gap 103 between the advancing working face 206 of the electrode 20b and the receding corresponding surface of the workpiece 100, and then forced to flow out through the outer gap 108 between the electrode 20b and the workpiece 100, thereby taking away the shavings and the heat generated during the machining operation.

Figure 8:
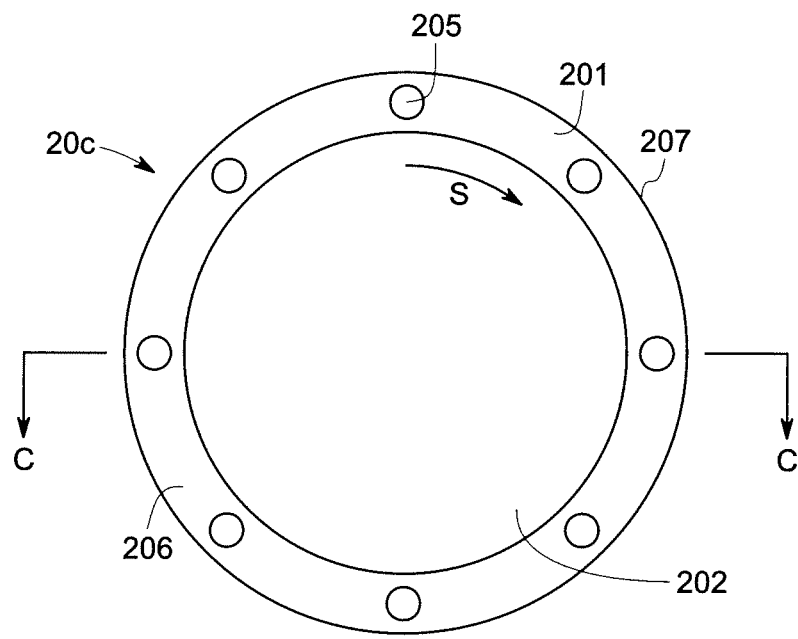
FIG. 8 is a plan view of a working face of a third embodiment of the electrode for implementing the first embodiment of the rough machining method.

A third embodiment of the electrode 20c for performing the first embodiment of the rough machining method is illustrated in FIGS. 8 and 9, wherein FIG. 8 is a plan view of the working face 206 of the third embodiment of the electrode 20c, and FIG. 9 is an enlarged cross-sectional view of the tip portion 207 of the electrode 20c, taken along line C-C of FIG. 8, during rough machining operation. The electrode 20c includes a plurality of slots 205 in the peripheral wall 201 without exposing to either the outer surface or the inner surface of the peripheral wall 201. As shown in FIG. 9, during rough machining operation, cool and clean cutting fluid is forced under high pressure from the cutting fluid supply 24 (FIG. 3) into the electrode 20c through the slots 205 in the peripheral wall 201, and flow across the working gap 103 between the advancing working face 206 of the electrode 20c and the receding corresponding surface of the workpiece 100, and then forced to flow out through the inner gap 107 between the electrode 20c and the core portion 104 as well as through the outer gap 108 between the electrode 20c and the sidewall of the annular groove 109, thereby taking away the shavings and the heat generated during the machining operation.

Figure 10:
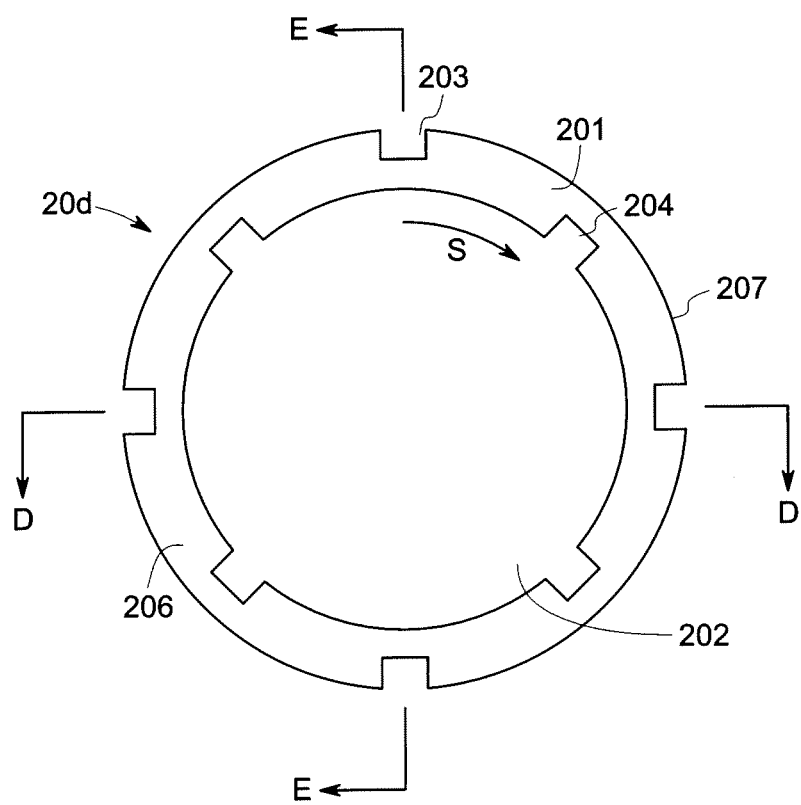
FIG. 10 is a plan view of a working face of a fourth embodiment of the electrode for implementing the first embodiment of the rough machining method.

FIG. 10 shows a plan view of the working face 206 of a fourth embodiment of the electrode 20d for performing the first embodiment of the rough machining method. The electrode 20d includes a plurality of slots 203 in the outer surface of the peripheral wall 201 and a plurality of slots 204 in the inner surface of the peripheral wall 201, and thus it is conceivable that cross-sectional views of the electrode 20d along line D-D and line E-E are respectively the same with those shown in FIGS. 5 and 7. During rough machining operation, cool and clean cutting fluid is forced under high pressure from the cutting fluid supply 24 (FIG. 3) into the electrode 20d through the slots 204 and the inner gap 107 between the electrode 20d with the core 101, and flows across the working gap 103 between the advancing working face 206 of the electrode 20d and the receding corresponding surface of the workpiece 100, and then forced to flow out through the outer gap 108 between the electrode 20d and the sidewall of annular groove 109, as well as the slots 203 in the outer surface of the peripheral wall 201 of the electrode 20d, thereby taking away the shavings and heat generated during the machining operation. Another alternate embodiment of slot is helical slot on outer surface or inner surface, or both.

FIG. 11 illustrates materials 102 to be removed from the workpiece 100 in order to define one channel 16 in the workpiece 100, as well as an exemplary strategy for machining such a channel 16 according to the first embodiment of the rough machining method of this invention. The materials 102 to be removed is curved in X, Y and Z direction. The first embodiment of the rough machining method for machining such a channel 16 includes several machining strategies.

The exemplary strategy includes five trepanning toolpaths P1, P2, P3, P4 and P5. For performing the exemplary strategy, the electrode 20 is advanced into the workpiece 100 from a preset start point from the front face 18 (illustrated in FIG. 1) and continuously erodes away shavings from the workpiece 100. After the electrode 20 has traveled along a predetermined path, a first annular groove 109 is formed with a first core 101 therein, and then the workpiece 100 is controlled to move, by movements of the support members 12-15, so as to have the electrode 20 out of the workpiece 100. Adjust the workpiece 100 and the electrode 20 to a position to begin the predetermined second toolpath P2, and then the third toolpath P3 respectively from a second and a third start points from the front face 18. A second and third annular grooves are generated with second and third cores respectively therein. Then, the workpiece 100 and the electrode 20 are adjusted so that the electrode 20 is advanced into the workpiece 100 from the outer circumferential face 17 to start the fourth toolpath P4 (as illustrated in FIG. 2) from a fourth start point to generate a fourth annular groove with a fourth core therein. Finally, perform the fifth toolpath P5 from a fifth start point from the outer circumferential face 17. The exemplary strategy is designated as that each annular groove meets with at least one of the other annular grooves, and once the five toolpaths are all performed, the five cores are all broken away and disconnected with the workpiece 100. The five cores are swept out of the workpiece 100 by the flowing cutting fluid, and thus five holes are defined after the exemplary strategy has been performed. Then start another machining strategy, if necessary, for machining the same channel 16.

The first embodiment of the rough machining method for machining each channel 16 may have just one machining strategy, or several different strategies. The strategies are calculated and optimized before the rough machining operation, and the controller 23 controls operations of the toolpathes. The exemplary strategy includes five toolpaths with three toolpaths started from the front surface 18 of the workpiece 100 and two toolpaths from the outer circumferential face 17. However, it is understandable that the strategy may includes different numbers of toolpaths from different start points, as long as the annular grooves meet, and thus the cores 101 generated can be broken and disconnected with the workpiece 100.

For obtaining an impeller with a plurality of channels 16 evenly distributed therein, since the channels 16 are identical in shape and size, the machining strategies for each channel 16 may be designed the same. In order to optimize the relative movement of the electrode 20 and the workpiece 100, the electrode 20 may firstly perform the same toolpath for each channel 16 in turn, and then start to perform a second toolpath for each channel 16. Taken as an exemplary strategy, the electrode 20 may firstly perform the first toolpath P1 for each channel 16, and then starts to perform the second toolpath P2 for each channel, then P3, P4, and finally P5. For a machining process with a number of machining strategies, the electrode 20 can firstly perform the toolpaths of different strategies which start from the same surface, for example the front surface 18, and then perform the toolpaths of different strategies started in other surface, for example the outer circumferential face 17.

FIGS. 12-14 illustrate a second embodiment of the rough machining method. The second embodiment includes at least two steps for rough machining a channel 16 in the workpiece 100. The first step is to advance the electrode 20 into the workpiece 100 from a first start point of the front face 18 along a first spiral tool path to define a first conic annular groove 109a with a first conic core 101a in the conic annular groove 109a. And the second step is to advance the electrode 20 into the workpiece 100 from a second start point of the outer circumferential face 17 along a second spiral toolpath, to define a second conic annular groove 109b with a second conic core 101b in the conic annular groove 109b. The first and the second annular grooves 109a, 109b meet with each other, and the first and the second conic cores 101a, 101b are broken and disconnected with the workpiece 100. The first and the second conic cores 101a, 101b may be swept out of the workpiece 100 by the flowing cutting fluid, or be taken out by a tool.

The electrode 20 used with the second embodiment of the rough machining method can also be tubular and may also has embodiments of the slots 203, 204, 205 in the peripheral wall 201. And the ratio between the diameter of the interior hollow portion 202 to the thickness of the peripheral wall 201 may be less than that used with the first embodiment of the rough machining method.

The first and the second embodiments of the rough machining method can also be used together. For example, generate some annular grooves 109 with cores 101 therein using the trepanning method from the front face 18 of the workpiece 100 as shown in FIGS. 5, 7, or 9, and generate a conic annular groove 109b with a conic cores 101b in the circumferential face 17 as shown in FIG. 14, the conic annular groove 109b meets with the annular grooves 109 and the cores 101 and 101b are all broken and disconnected with the workpiece 100.

For both the first and second embodiments of the rough machining method, this invention is not limited to rough machining methods with only one electroerosion tool 200. In other embodiments, two electroerosion tools 200 work simultaneously to perform different toolpaths start from different start points. For example, one electroerosion tool 200 performs the toolpathes started from the front surface 18 of the workpiece 100, and the other electroerosion tool 200 performs the toolpathes started from the outer circumferential face 17 of the workpiece. The two electroerosion tools 20 may have two controlled axes of NC machines 21. It is conceivable that by performing the rough machining operation simultaneously, the multi axis controlling system should be changed in order to ensure that the two electroerosion tools 200 will not superimposition.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A rough machining method for machining a channel in a workpiece, comprising:
   energizing one of a workpiece and an electrode as an anode and the other as a cathode;
   advancing the electrode into the workpiece from a first start point to travel a first toolpath, so as to generate a first annular groove with a first core connecting with the workpiece;
   advancing the electrode into the workpiece from a second start point to travel a second toolpath, so as to generate a second annular groove with a second core connecting with the workpiece, wherein the second annular groove intersects with the first annular groove, and the first and the second cores are at least partially broken and disconnected with the workpiece upon intersecting of the first and the second annular grooves; and
   circulating a cutting fluid cross a working gap between a working face of the electrode and the workpiece.

2. The rough machining method according to claim 1, wherein the first and the second cores are broken and disconnected from the workpeice by additional toolpaths started from a start point different from the first and second start points.

3. The rough machining method according to claim 1, wherein the first and the second cores are broken and disconnected with the workpiece upon intersecting of the first and the second annular grooves.

4. The rough machining method according to claim 1, wherein each step of advancing the electrode into the workpiece is a trepanning operation, and each of the toolpaths is a straight path.

5. The rough machining method according to claim 1, wherein the electrode spins during the machining operation.

6. The rough machining method according to claim 1 further comprising a step of providing a multi-axis controlled NC machine for supporting the electrode.

7. The rough machining method according to claim 1, wherein the first and second start points of the toolpathes are respectively in a front face and a circumferential face of the workpiece.

8. The rough machining method according to claim 1, wherein at least one of the steps of advancing the electrode into the workpiece is along a spiral toolpath and generates a conic annular groove with a conic core in the conic annular groove.

9. The rough machining method according to claim 8, wherein both steps of advancing the electrode into the workpiece are along spiral toolpathes and generate conic annular grooves with conic cores respectively therein, the annular grooves intersecting with each other and the conic cores being completely disconnected from the workpiece.

10. The rough machining method according to claim 1, wherein the electrode is profiled as having a peripheral wall and a hollow portion surrounded by the peripheral wall, the cutting fluid flowing into the hollow portion and cross the working gap.

11. The rough machining method according to claim 10, wherein the electrode is provided with slots in the peripheral wall for cutting fluid flow.

12. The rough machining method according to claim 11, wherein the slots are defined in an outer surface of the peripheral wall.

13. The rough machining method according to claim 11, wherein the slots are defined in the peripheral wall without being exposed to either an inner surface or an outer surface of the peripheral wall.

14. The rough machining method according to claim 11, wherein the slots are defined in an inner surface of the peripheral wall.

\* \* \* \* \*